US005756979A

United States Patent [19]

Murakami et al.

[11] Patent Number: 5,756,979

[45] Date of Patent: May 26, 1998

[54] APPARATUS FOR POSITIONING WEB IN PLACE

[75] Inventors: Tetsuya Murakami; Hisakichi Hashimoto; Fumiyuki Iwano; Michio Ueda, all of Tokushima, Japan

[73] Assignee: Shikoku Kakoki Co., Ltd., Tokushima, Japan

[21] Appl. No.: 707,197

[22] Filed: Sep. 10, 1996

[30] Foreign Application Priority Data

Sep. 11, 1995 [JP] Japan .................................... 7-232371

[51] Int. Cl.[6] .................................................. G06K 7/10

[52] U.S. Cl. ................................................ 235/454; 53/451

[58] Field of Search ................................ 53/451; 235/454

[56] References Cited

U.S. PATENT DOCUMENTS 4,754,593 7/1988 Ishihara et al. ............................ 53/551
4,860,522 8/1989 Cherney .................................... 53/451

FOREIGN PATENT DOCUMENTS 0 074 165 3/1983 European Pat. Off. .
2 217 833 11/1989 United Kingdom .

*Primary Examiner*—Harold Pitts
*Attorney, Agent, or Firm*—Armstrong, Westerman, Hattori, McLeland & Naughton

[57] ABSTRACT

An apparatus for use with a web having printed thereon bar codes each identifying a container manufacturer, product, etc. and arranged longitudinally of the web at a spacing corresponding to one container, for positioning each of the bar codes in a specified position. The positioning apparatus comprises a feeder drivable by a main shaft for transporting the web via the specified position, a detector for detecting the angle of rotation of the main shaft upon the bar code moving past the specified position, and a calculating unit for calculating the deviation of the angle detected by the detector from a predetermined reference angle and determining as an amount of transport by the feeder a set value corresponding to the calculated deviation based on a predetermined relationship between deviations and set values.

4 Claims, 3 Drawing Sheets

APPARATUS FOR POSITIONING WEB IN PLACE

BACKGROUND OF THE INVENTION

The present invention relates to an apparatus for positioning, for example, a packaging material web in a sealing-cutting position for use in a packaging machine for forming the web into a tube while transporting the web at a constant speed, filling the tube with contents, cutting the tube into lengths each corresponding to one container to obtained sealed pillowlike containers and finally making the containers into a rectangular parallelepipedal containers.

As disclosed, for example, in JP-A-267646/1988, apparatus of the type mentioned are already known which are adapted for use with a web bearing printed rectangular marks elongated in the direction of transport of the web and arranged longitudinally thereof at a spacing to position each of the marks in a specified position. The conventional apparatus comprises a feeder for transporting the web via the specified position by a variable amount at a time, two photoelectric detectors arranged in the specified position and spaced apart by a distance slightly smaller than the length of the mark, discrimination means for recognizing the amount and direction of deviation of the mark from the specified position based on on-off signals from the two detectors, and setting means for determining the amount of transport by the feeder from the result obtained by the discrimination means.

The apparatus described requires printing the marks on the web specifically for use in positioning the web in place. On the other hand, the web has a graphic presentation of the product printed thereon. If the graphic presentation resembles the positioning mark, the detectors are likely to detect the presentation as the mark in error. It is therefore required that the graphic presentation of the product have nothing similar to the positioning mark, whereas difficulties are encountered in preparing marks for use with the graphic presentations of widely diversified products.

SUMMARY OF THE INVENTION

An object of the present invention is to provide an apparatus free of the foregoing problem and adapted to position a web in place.

The present invention provides an apparatus for use with a web having printed thereon bar codes each identifying a container manufacturer, product, etc. and arranged longitudinally of the web at a spacing corresponding to one container, for positioning each of the bar codes in a specified position, the positioning apparatus comprising a feeder drivable by a main shaft of the apparatus for transporting the web via the specified position, detection means for detecting the angle of rotation of the main shaft upon the bar code moving past the specified position, and calculation means for calculating the deviation of the angle detected by the detection means from a predetermined reference angle and determining as an amount of transport by the feeder a set value corresponding to the calculated deviation based on a predetermined relationship between deviations and set values.

The detection means detects the angle of rotation of the main shaft upon each bar code moving past the specified position. The calculation means calculates the deviation of the angle detected by the detection means from a predetermined reference angle and determines the amount of the web to be transported, based on the calculated deviation and a predetermined set value corresponding to the deviation. The web is transported by the amount thus determined.

According to the present invention, therefore, the amount of the web to be transported can be determined utilizing the bar code, and the mark to be used specifically for positioning the web need not be printed on the web.

Preferably, the detection means comprises a bar code reader disposed in the specified position, an encoder for detecting the angle of rotation of the main shaft, and discrimination means for recognizing as the detected angle an outputs signal given by the encoder upon the bar code reader delivering an output signal.

The bar code reader reads the bar code, and the encoder detects the angle of rotation of the main shaft. Upon the bar code reader outputting a signal, the output signal of the encoder is recognized by the discrimination means as indicating the detected angle, so that the time when the bar code moves past the specified position can be detected accurately.

When the calculation means comprises a setting device for setting the amount of transport by the feeder, and means for correcting a set value of the setting device in accordance with the calculated deviation, the amount of the web to be transported is determined every cycle. Consequently, the bar code can be positioned in place accurately.

The value to be set on the setting device is the amount to be transported by the feeder for one cycle, and the value of the setting device is positively corrected when the detected angle is within a permissible angular range greater than the reference angle or negatively corrected when the detected angle is within a permissible angular range smaller than the reference angle. The feeder is driven for one cycle at a time by the main shaft every time the shaft is rotated for one cycle. Accordingly, the amount of the web to be transported is corrected every time the web is transported for one cycle, and the feeder is driven based on the corrected value.

The web can therefore be transported by amounts within a permissible range with errors diminished within tolerable limits at all times.

DESCRIPTION OF THE PREFERRED EMBODIMENT

An embodiment of the present invention will be described below with reference to the drawings.

Figure 1:
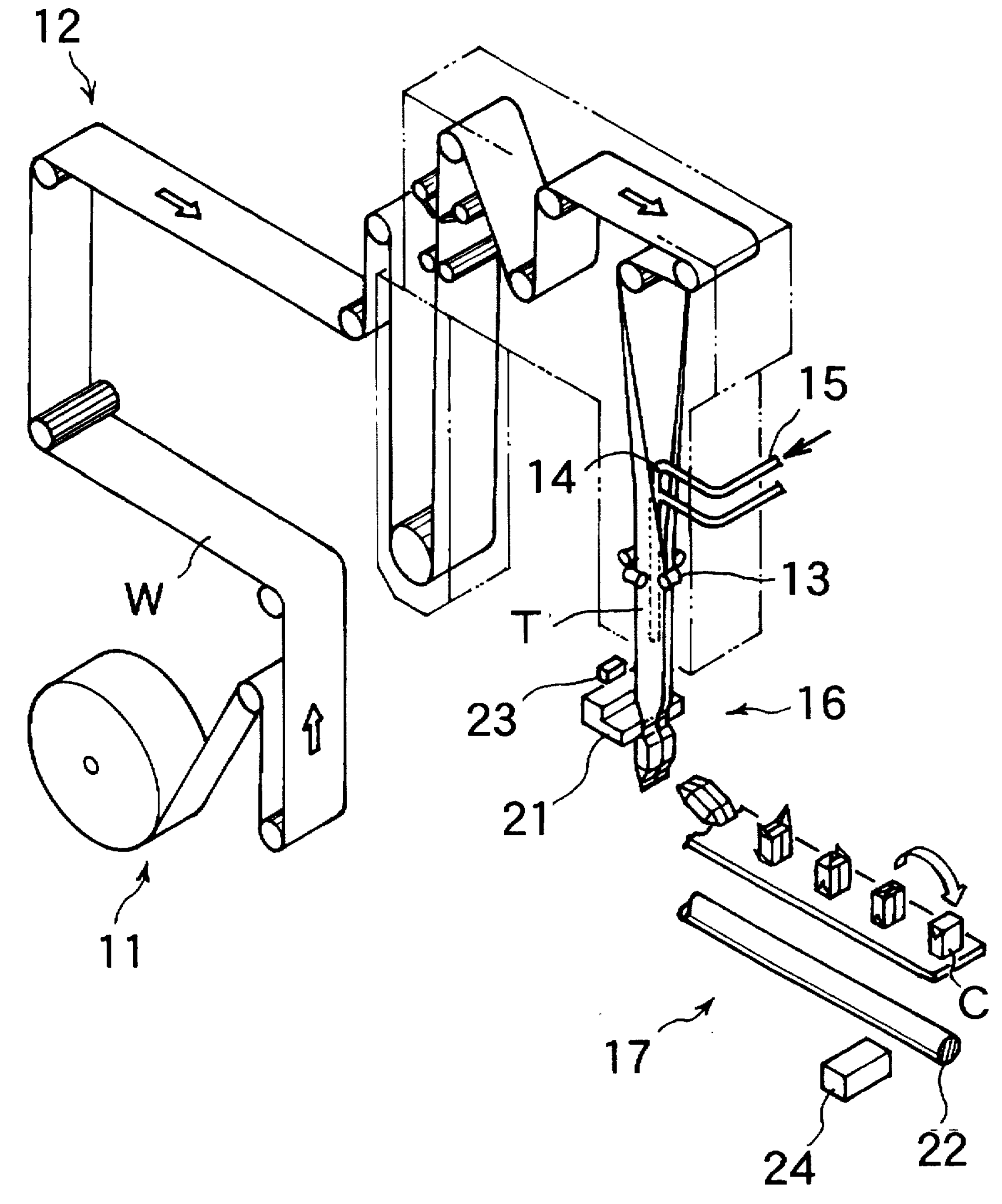
FIG. 1 is an overall perspective view of a packaging machine including an apparatus of the invention.

FIG. 1 shows a packaging machine for making a packaging material web W into rectangular parallelepipedal containers C which are eventually filled with contents. The machine comprises a rewinder 11 for supporting a roll of web W thereon, an unwinding device 12 for continually unwinding the web W from the rewinder 11, a tube forming device 13 for forming a tube T from the unwound web W, a liquid supply duct 15 having a vertical filling pipe 14 inserted into the tube T for filling contents into the tube T to a specified level, a container forming device 16 for forming contents-filled pillowlike containers by transporting the filled tube T by a length at a time which length corresponds approximately to one container and sealing and cutting the tube, and a container completing device 17 for eventually forming the pillowlike containers into rectangular parallelepipedal containers C.

The container forming device 16 has two openable pairs of sealing-cutting jaws 21 (although only one pair is shown). The packaging machine has a main shaft 22, which, while making one turn of rotation through 360 deg, moves the two pairs of jaws 21 upward and downward in opposite directions to each other, causing each pair to complete one cycle. Accordingly, the main shaft 22 rotates through 180 deg as one cycle of rotation for forming one container.

The amount of web to be transported for one cycle of operation of the container forming device 16is variable by altering the amount of folding of triangular ears in forming in the pillowlike container although this will not be described in detail.

At the upstream side of, and immediately adjacent to, the jaws 21of the container forming device 16, a bar code reader 23is disposed as opposed to the path of transport of the web W. The main shaft 22is provided with an encoder 24.

Figure 2:
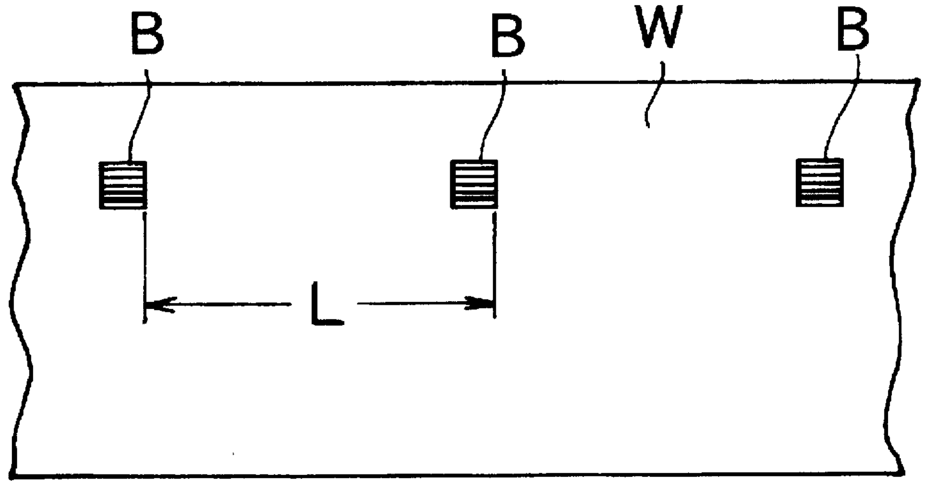
FIG. 2 is a diagram for illustrating bar codes provided on a web.

With reference to FIG. 2, the web W has printed thereon bar codes B each identifying the manufacturer of the containers, the product, etc. and arranged at an approximately constant spacing. The spacing L between the adjacent bar codes B corresponds approximately to the length of one container and involves a manufacturing error.

Figure 3:
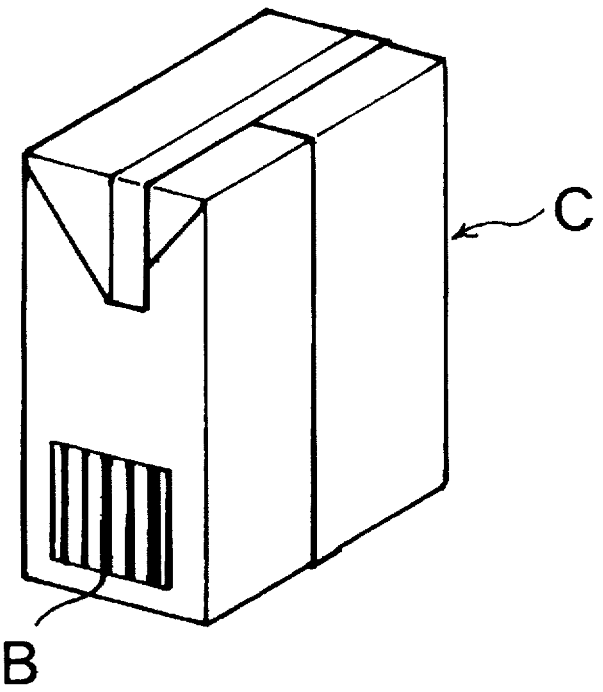
FIG. 3 is a diagram for illustrating a bar code provided on a container.

FIG. 3 shows the container C prepared from the web W and eventually completed. The bar code B is positioned near the bottom of one side face of the container.

Figure 4:
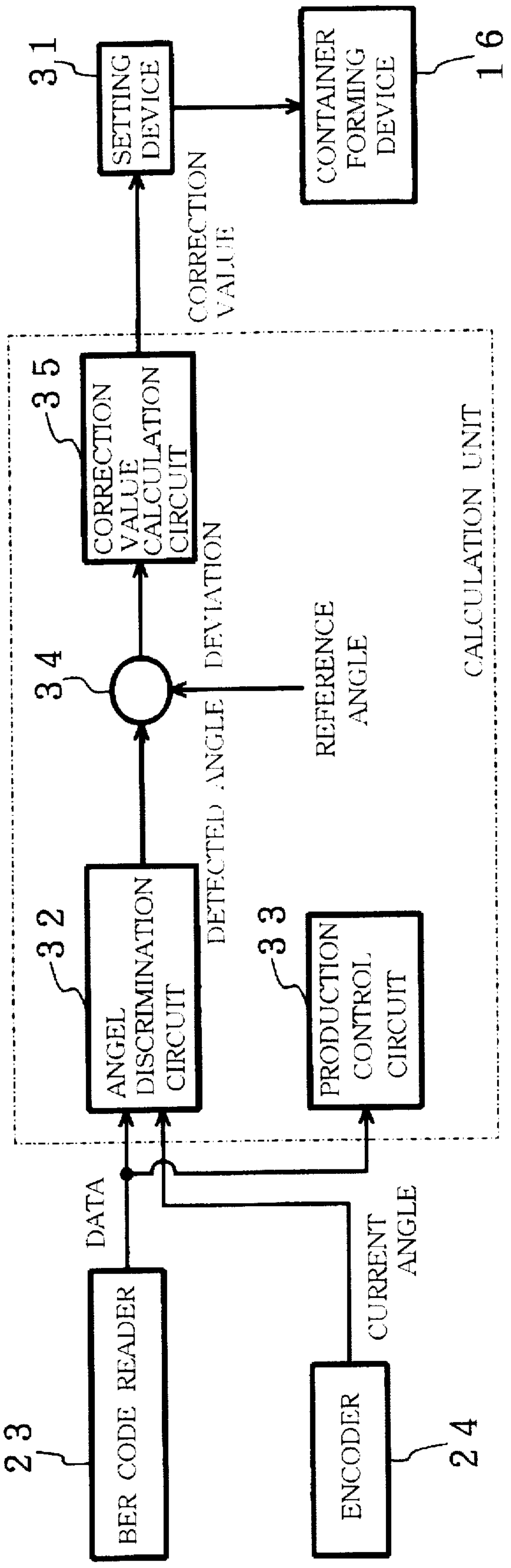
FIG. 4 is a block diagram showing the electrical construction of the apparatus of the invention.

The web is positioned in place to be described below with reference to FIG. 4.

The web is positioned as specified by varying the amount of web to be transported by the container forming device 16, for every cycle of producing one container. The angle of rotation of the main shaft 22 is 180 deg per cycle.

The amount of transport of the web by the container forming device 16 is determined by a value to be set on a setting device 31. The device 31 has input thereto a set value determined in the preceding cycle.

When a particular bar code B on the web B has moved past the bar code reader 23, the reader 23 reads the bar code. The data read by the bar code reader 23 is fed to an angle discrimination circuit 32. On the other hand, the angle of rotation of the main shaft 22 detected by the encoder 24 is input to the angle discrimination circuit 32. The rotation angle of the main shaft 22 obtained upon receiving the data read by the bar code reader 23 is recognized by the angle discrimination circuit 32 as a bar code detection angle. The detection angle is fed to a subtracter 34. The subtracter 34 has a reference angle input thereto and calculates the deviation of the detection angle from the reference angle. The deviation is fed to a correction value calculation circuit 35, which determines a correction value corresponding to the deviation and delivers the correction value to the setting device 31. In the setting device 31, the correction value is added to the set value determined in the preceding cycle to obtain a corrected value, and the set value is replaced by the corrected value thus determined in the current cycle. The corrected value serves as a new set value. In accordance with the new value, the container forming device 16 transports the web by an amount corresponding to one cycle.

The data read by the bar code reader 23 is fed also to a production control circuit 33 and used for production control.

Now numerical values will be given for illustrating a specific example of transport operation. The reference angle is 160 deg (included in 180 deg for one cycle). The permissible angular range greater than the reference angle is 160 to 164 deg, and the permissible angular range smaller than the reference value is 157 to 160 deg. If the detection angle is 160 to 164 deg, the deviation is 0 to +4. If the detection angle is 157 to less than 160 deg, the deviation is −3 to less than 0. The calculation circuit gives the following correction value based on the deviation. The correction value is +0.5 when the deviation is 0 to +4, or the correction value is −0.5 when the deviation is −3 to less than 0. If the deviation is outside the above ranges, a correction value of −8.0 is taken to quickly make a great correction so that the detection angle will be included within the permissible limits. The correction values are expressed in mm. The correction value determined is added to the present set value to set a corrected new value on the setting device.

What is claimed is:

1. An apparatus for use with a web having printed thereon bar codes each identifying a container manufacturer, product, etc. and arranged longitudinally of the web at a spacing corresponding to one container, for positioning each of the bar codes in a specified position, the positioning apparatus comprising:

a feeder drivable by a main shaft of the apparatus for transporting the web via the specified position, detection means for detecting the angle of rotation of the main shaft upon the bar code moving past the specified position, and calculation means for calculating the deviation of the angle detected by the detection means from a predetermined reference angle and determining as an amount of transport by the feeder a set value corresponding to the calculated deviation based on a predetermined relationship between deviations and set values.

2. A positioning apparatus as defined in claim 1 wherein the detection means comprises a bar code reader disposed in the specified position, an encoder for detecting the angle of rotation of the main shaft, and discrimination means for recognizing as the detected angle an output signal given by the encoder upon the bar code reader delivering an output signal.

3. A positioning apparatus as defined in claim 1 or 2 wherein the calculation means comprises a setting device for setting the amount of transport by the feeder, and means for correcting a set value of the setting device in accordance with the calculated deviation.

4. A positioning apparatus as defined in claim 3 wherein the value to be set on the setting device is the amount to be transported by the feeder for one cycle, and the value of the setting device is positively corrected when the detected angle is within a permissible angular range greater than the reference angle or negatively corrected when the detected angle is within a permissible angular range smaller than the reference angle, the feeder being drivable for one cycle at a time by the main shaft every time the shaft is rotated for one cycle.

* * * * *